June 7, 1938.  E. R. LOCHMAN  2,119,549
COMBINED HEADLIGHT AND DIRECTION INDICATOR FOR
VEHICLES, AND CONTROLLING DEVICE FOR SAME
Original Filed Feb. 8, 1932  5 Sheets-Sheet 1

INVENTOR.
Emil R. Lochman
BY
ATTORNEY.

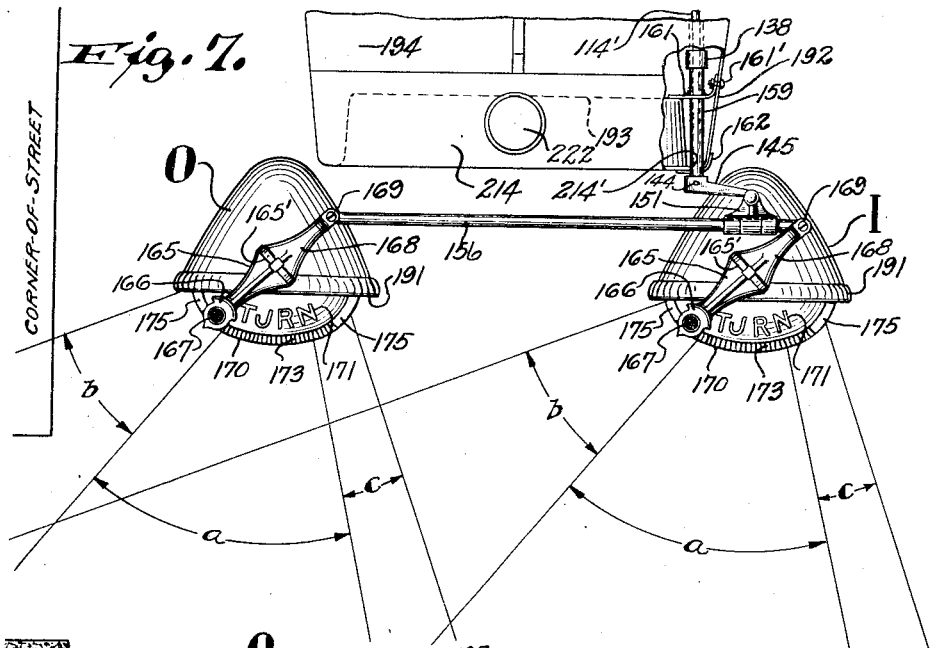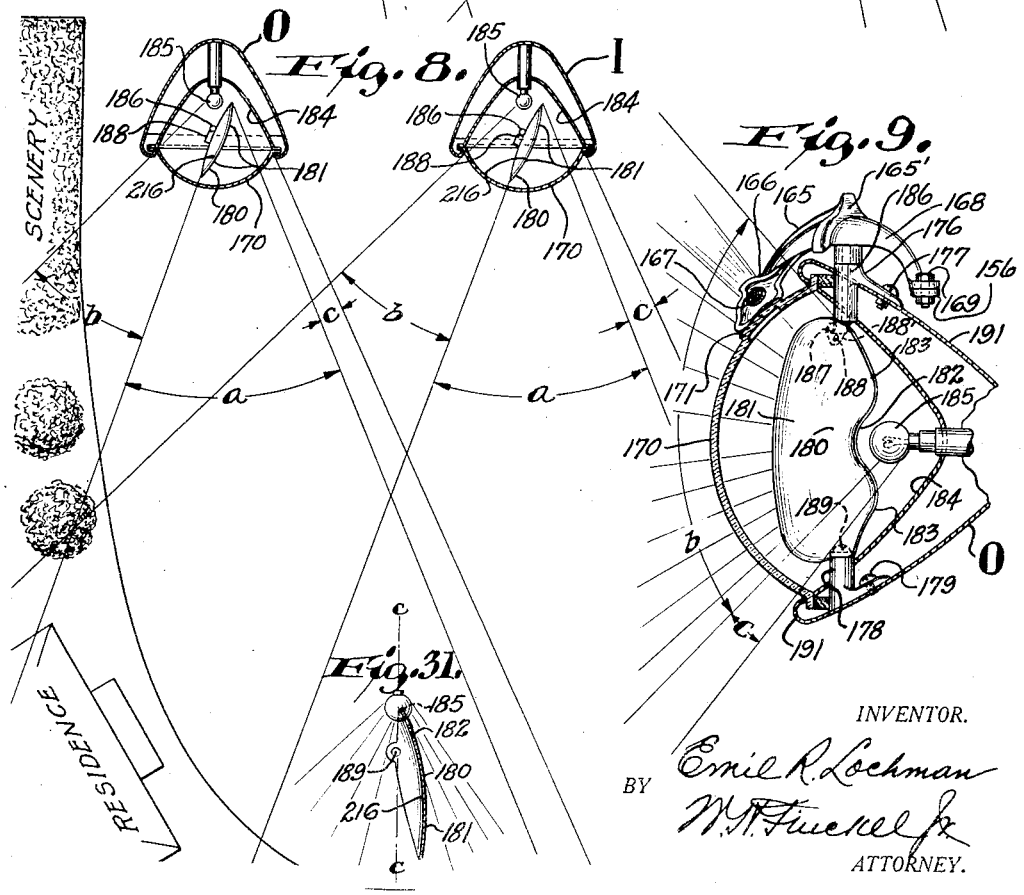

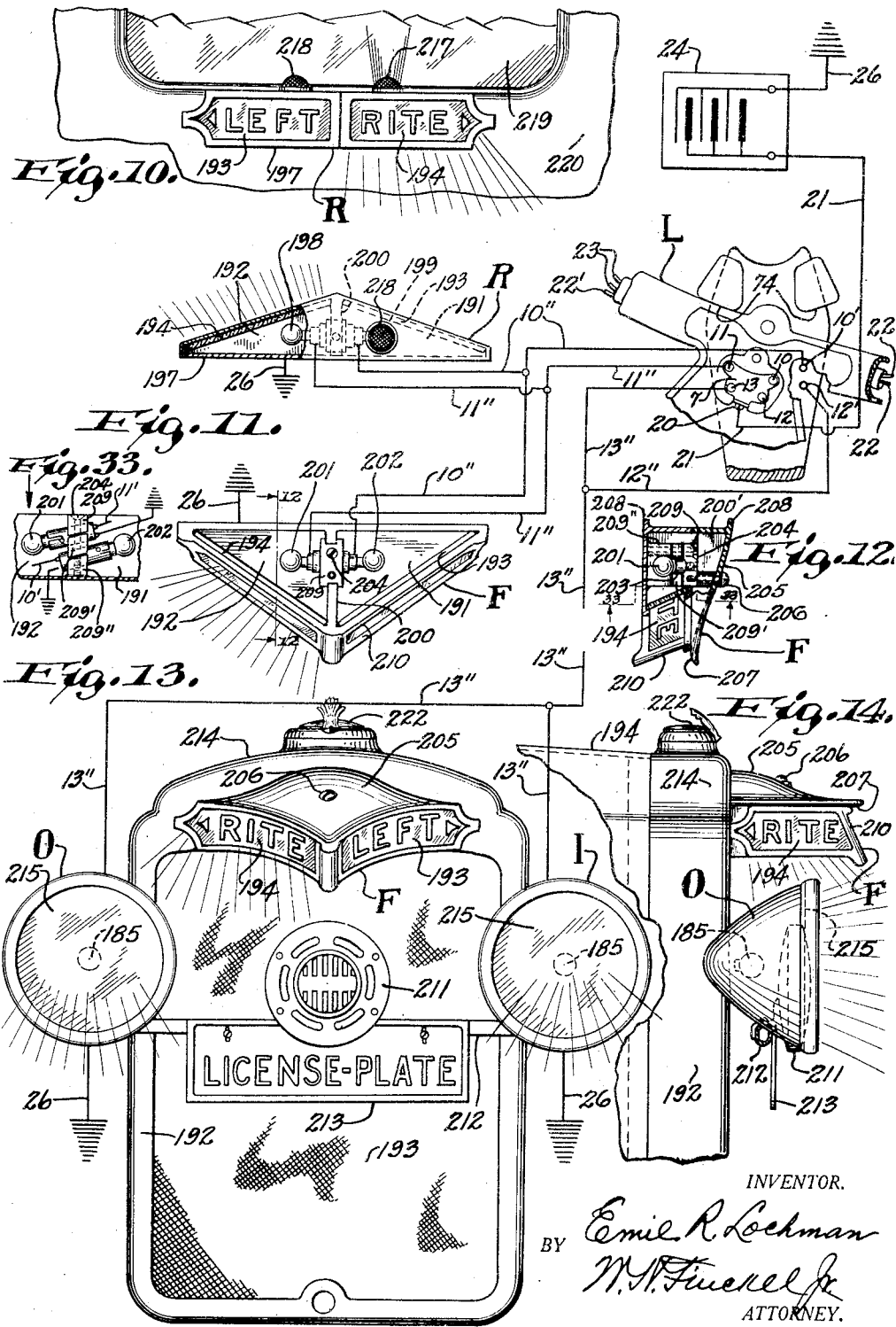

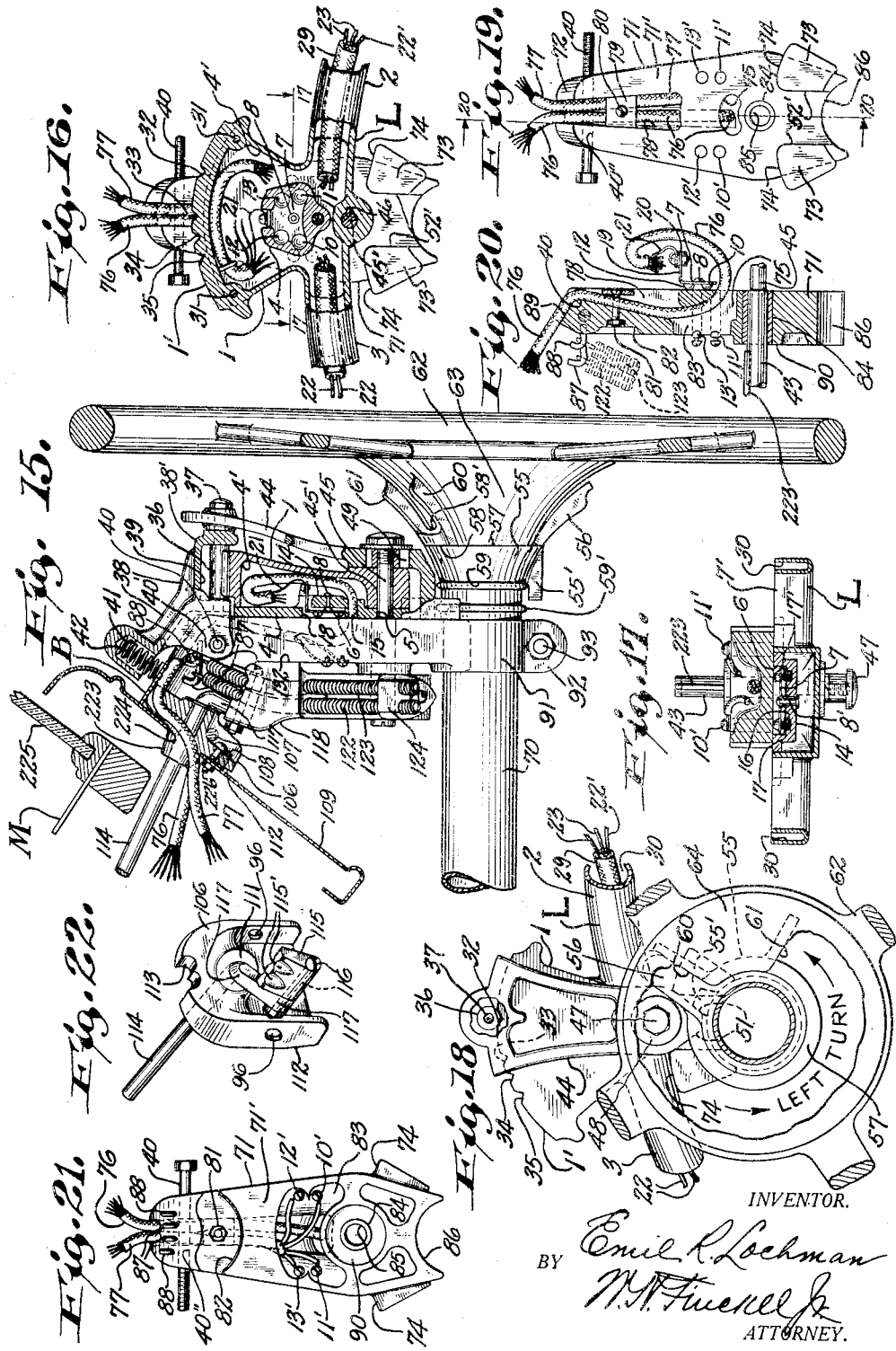

June 7, 1938.  E. R. LOCHMAN  2,119,549
COMBINED HEADLIGHT AND DIRECTION INDICATOR FOR
VEHICLES, AND CONTROLLING DEVICE FOR SAME
Original Filed Feb. 8, 1932   5 Sheets-Sheet 5
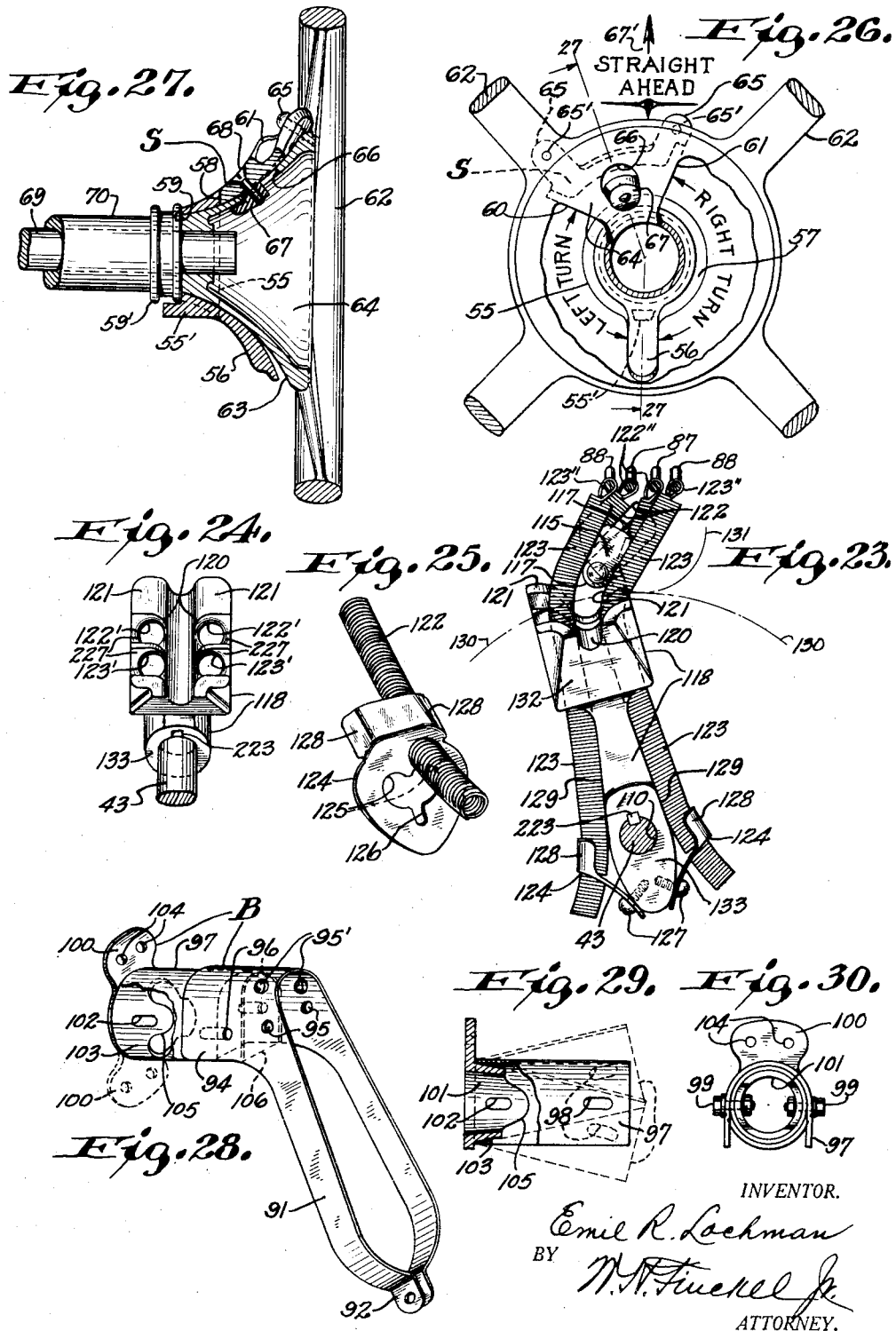

Patented June 7, 1938

2,119,549

UNITED STATES PATENT OFFICE 2,119,549

COMBINED HEADLIGHT AND DIRECTION INDICATOR FOR VEHICLES, AND CONTROLLING DEVICE FOR SAME

Emil R. Lochman, Milwaukee, Wis.

Application February 8, 1932, Serial No. 591,690
Renewed September 1, 1937

5 Claims. (Cl. 177—337)

This invention relates to combination headlights and traffic signals for motor vehicles, and to a system for mounting and operating same, and embodies improvements on the devices of a similar nature disclosed in my copending application Serial No. 470,985 filed July 26, 1930.

The primary object of this invention is to provide a vehicle headlight system having new features and capable of furnishing important services in addition to those of the headlights now in use without increasing the consumption of electric current used or adding lamps, and to increase the safety and riding comfort and enjoyment of the users of the vehicle.

A further object of the invention is to provide direction signals, which will be apparent in either day or night driving, with a special view to making daylight signalling far more effective by simultaneously lighting the headlights together with the traffic signal in order to readily arrest the attention of other vehicle drivers, as well as pedestrians, of intended turns of the vehicle, thereby increasing the safety of the vehicle in traffic.

Another object of the invention is to provide an improved control mechanism arranged in such relation to the steering wheel of the vehicle that the operator need not remove his hands from the wheel in order to operate the headlight and signal apparatus.

A further object is to provide a simplified and more effective operating mechanism including a new single tooth and single groove pair of bevel gear sectors containing elements for automatically returning to straight ahead position, thus saving a considerable number of operating parts, as well as providing means for taking up all wear of said sectors automatically, thereby preventing rattling of parts.

Another object is to provide a more effective automatic resetting system for said signals fitted to and operating with the steering wheel and prefixed separately for a greater right hand turn and for a lesser left hand turn, according to a greater turn of the steering wheel for a right hand turn, and a lesser turn of the steering wheel for a left hand turn, thus keeping the signals and headlights on until the vehicle has turned about two thirds around the corner.

Still another object of the invention is to provide, in combination with the headlights of a vehicle, means whereby a portion of the light may be reflected in any desired direction, the remainder being normally projected ahead upon the road, whereby the lights may be used also as a touring light to illuminate the sides of the road, and render road markers, signs, crossroads, etc. visible.

Another object of the invention is to provide a device of this character which is applicable to any automobile without special alteration of the parts of the automobile.

A further object is to reduce traffic noise by providing a small horn and button switch for ordinary city driving, and a larger horn wired to and operated together with said smaller horn from a second button switch for giving quick and powerful danger signals for country driving, and in any dangerous situation.

A further object is to have the moving parts of the headlights small and of relatively light weight, and to provide a rod, link and hinge connection and an automatic release for returning these parts to their normal straight-ahead position when the driver has about completed the turning of a corner.

Another object of the invention is to provide front and rear direction signals of uniform construction and prominent uniform location with respect to the longitudinal center of the vehicle, so that they are visible a considerable distance from the front and rear, as well as in angular sidewise directions.

A further object is to provide means whereby the front and rear signalling may be performed by the driver by one movement of a lever without releasing his hands from the steering wheel, and another object is to combine these light signals with a sound signal by the same single operation of a lever, with its horn button end.

A further object is to provide, in combination with the headlights of a vehicle, means to effectively prevent glaring while at the same time lighting up the right or driving side of the road brightly and with increased intensity, thereby greatly increasing the enjoyment and safety of night driving.

With the above and other objects in view the invention consists of the improved combination headlights, touring light and traffic signals for vehicles, for both front and rear signalling, and their parts and combinations, as I will proceed now more particularly to explain and finally claim.

In the accompanying drawings illustrating the invention, in the several figures of which like parts are similarly designated, Fig. 1 is a sectional side elevation of the entire device of the invention, and a portion of those parts of an automobile to which it is operatively attached, the electrical circuit being shown diagrammatically. Fig. 2 is a plan view of the controlling apparatus in operative relation to the steering wheel, and of a headlight and pointer, as well as the rod, link and hinge connection between the controlling apparatus and the headlight, all shown in straight-ahead position, and with parts broken away in the interest of clearness. Fig. 3 is a perspective front view of a headlight and pointer set for a left hand turn, with the link and hinge connection in said respective position, with parts broken away to clearly show this detail. Fig. 4 is a central vertical cross section of the release 44 shown in connection with respective operating parts. Fig. 5 is a vertical side view of the rod, link and hinge connection for operating the moveable parts of the headlights, with parts broken away to show the operating features in proper relation to each other, and a dotted view showing the respective swing of said parts. Fig. 6 is a front view of the ratchet for holding and releasing the control lever. Fig. 7 is a plan view of the headlights and their mounting, the operating and moving parts being shown as set for a right hand turn. Fig. 8 is a sectional plan view of the headlights provided with reflectors of concavo-convex or saucer-like form, curved upon both their vertical and horizontal axes and showing the light reflecting effect with the reflectors partially turned for night driving and lighting up the right side of the road, herein further referred to as "touring light". Fig. 9 is a vertical, longitudinal sectional elevation of the outer headlight O, showing the pointer and its mounting in elevation and it and the reflector at an angle as in Fig. 7, the concave side of the reflector being set to the outer or right hand side of the road. Fig. 10 is a front elevation of the rear signal showing the method of mounting and operating same. Fig. 11 is a plan view of the rear and front signal, both being of like general construction, the electrical circuit being shown diagrammatically and attached to the switch operated by the lever L and all shown set for a right hand turn. Fig. 12 is a sectional view of the front signal taken substantially on the line 12—12 of Fig. 11, shown however with the top attached and in cross section. Fig. 13 is a front elevation of my invention with the signal parts removed from the headlights and the front signal mounted in place thereof, also showing the location of one of the signal horns. Fig. 14 is a side elevation of Fig. 13, showing the ornamental streamline effect of the front signal as mounted and combined with the radiator casing; both Figs. 13 and 14 showing the effective daylight signalling by lighting the headlights in connection with the front signal. Fig. 15 is an enlarged side elevation of the controlling device mounted in its proper position on the steering wheel with parts broken away to bring out the connection and position of its working parts. Fig. 16 is a top plan of the lever L with parts broken away to show the switch parts and wiring mounted thereon, and its connection with the mounting block 71. Fig. 17 is a sectional view on line 17—17 of Fig. 16 also reading with Fig. 18 by having the contacts closed for a left turn. Fig. 18 is a top plan view of the respective controlling parts set for a left turn, and the steering wheel turned to the left and ready to automatically release the parts for straight ahead. Fig. 19 is a front view of the mounting block. Fig. 20 is a sectional view on line 20—20 of Fig. 19 showing the respective slots and openings for passing the wire cables, and the normal position of the contact plate 7, as well as the manner of hooking the gear springs 122, 123. Fig. 21 is a rear view of the mounting block showing the wires connected to the respective contacts. Fig. 22 is a perspective view of the bearing block for the operating rod 114 with its single tooth gear. Fig. 23 is a plan view of a pair of single tooth, single groove flexible bevel gear sectors set at an angle for a left turn. Fig. 24 is a top view of the single groove gear sector 118, showing its single groove and the sockets for receiving the operating springs. Fig. 25 is a perspective view of a clip for holding and adjusting the operating springs with one spring in hooked position. Fig. 26 is a top plan view of the steering wheel hub with the release sector S, and the release ring 57 in straight ahead position. Fig. 27 is a cross section on line 27—27 of Fig. 26 showing the method of mounting the sector S on the hollow hub of the steering wheel. Fig. 28 is a perspective view of the mounting yoke 91 for holding the mounting block firmly against the steering post, and its rearward extension parts for operatively mounting the respective parts against the instrument board or other member of the body of the vehicle. Fig. 29 is a cross section of the mounting bracket and an extension shown in central position and shown in dotted angular positions. Fig. 30 is a front view of said mounting bracket and said extension. Fig. 31 is a horizontal cross section through the center of the movable reflector showing the free passage of the light rays in its normal straight ahead position, as well as showing its concave and convex reflection surfaces. Fig. 32 is an enlarged view of the central section 1 of the operating lever L and the release 44 illustrating the marked position for "touring light". Fig. 33 is a a sectional view on line 33—33 of Fig. 12 showing the mounting and wiring of the signal lights.

Referring now to the drawings, starting with the control apparatus, L is the control lever having a hollow central section 1 and two extending arms 2 and 3 having respective channels 30 receiving the insulating casings 29 for carrying and protecting the respective circuit wires 22 and 23 to the horn button switches 27, 28 mounted in suitable sockets in the outer ends of said arms 2 and 3. The switch plate 4 has a bore 5 through which the pivot 45' passes and which together with the screws 31 mount it firmly on the lower edge of the hollow section 1 thus forming a chamber 4' into which extends the central raised section 14 of said switch plate, which has a socket 6 into which the contact plate 7 is loosely inserted. Four small springs 17 are set into four small sockets 17' and the outer ends of said springs are seated and press into the four hollow contact points 10, 11, 12 and 13, and said contact plate 7 is held in a resilient position in said socket 6 by a hollow rivet 8 passing through a countersunk hole 8' and riveted over so as to allow sufficient play for the contact points to extend over the bottom surface sufficiently to always form a complete contact when switched over the contact plugs 10' 12' for lighting the signals and headlights for a left turn, and the plugs 11' 13' for lighting the signals and headlights for a right hand turn. The contact plugs are firmly moulded into the mounting block and are set even with the surface of the latter. The contact plate and contact plugs are preferably made of bronze for efficient wearing and electric contact service. Said contact plate 7 is preferably stamped out of sheet metal and has a small lug 19 extending upwardly through a slot 18 into the hollow chamber 4' where it is connected to wire 21 with the small screw 20.

The wiring diagram depicted in Fig. 1 shows the single wire system used in automobile lighting, leading from the battery 24 to the respective switch and from there to the operating object where the circuit is completed by ground return through the metal construction parts of the automobile to which the battery is also grounded by wire 26. The headlight wires 12" 13" lead from the headlights I O through the cable 77 to the contacts 12' 13', and the signal wires 10" 11" lead from the signals through the same cable 77 to the contacts 10' 11' (see Fig. 21) and the wire 21 leading from the battery connection 25 to the contact 20 of the contact plate 7 which has four contact points, and always completes the headlight circuit, thereby lighting both headlights, and one signal circuit, thereby lighting one side of the signal, as shown in Fig. 11 where the lever L carrying said contact plate 7 is set for the right turn and the right signals and both headlights are lighted. The signalling horns 211 221 are connected as follows: Wire 23 leads from the large lower pitched horn 221 to the horn button switch 28 and from the return connection 23 of said switch to the battery connection 25, and the smaller higher pitched horn 211, preferably located between the headlights in front of the radiator, has its wire 22 leading through the cable 76 to the horn button switch 27 and from the return connection 22 to the battery connection 25. Another wire 22' is shunted in on wire 22, also leading through cable 76, but to the horn button switch 28, so that when that button switch 28 is closed the large as well as the small horn is sounded.

This double horn arrangement coupled with the two-button switch lever L supplies the improvement of selective horn signals now required especially in the large cities to reduce the traffic noise, by giving the selection of sounding the small horn in city traffic, and both horns for highway traffic in the open country, or in any dangerous situation, by opening only the fingers of one hand for operating either the small horn by pressing the button switch 27, or both horns, by pressing the button switch 28. It will be noted that in either case only the fingers of one hand need to be opened to reach the horn button, while both hands retain their usual position on the steering wheel. This is of great importance, as the old position of the horn button in the center of the steering wheel requires one hand of the driver to be entirely released from the steering wheel in order to sound the horn, while both hands are required for effective steering in dangerous situations. It will further be noted that the light and direction signals for an intended turn are operated at the same time and with the motion of the fingers of the same hand, when so required, as the sounding of the horn or horns. It is further evident, that the wiring for the double horn signal may be changed from button 28 to button 27.

The controlling device with its double armed lever L is firmly mounted on the steering post 70 by means of the mounting yoke 91, which clamps the mounting block 71 in proper position by the bolt 93 drawing the end lugs 92 tight. The rear end of said mounting yoke 91 is mounted on the bearing block 106 by bolt 107 passing through the holes 96 and applying a nut as known in common practice. This bearing block 106 has a rearward extending bearing 223 passing through a hole 224 in the instrument board 109 and is mounted on the latter by the small bolts 226, it further has a setscrew 108 and a convex rear surface 112, and by means of the latter, is brought in perfect alinement with the front bearing 159, located in the radiator casing 192, so that the operating rod 114 turns freely in said bearings. When said bearing block 112 is thus adjusted and firmly set and mounted, said bolt 107 is tightened, which then holds the rear end of said mounting yoke 91 in proper working position. The respective distance and angle between the instrument board and the steering post and wheel, differ greatly in the various makes and sizes of automobiles, therefore an adjustable extension is provided (see Figs. 28, 29 and 30), where the bearing bracket 106 is set a considerable distance away from the instrument board 109 and the adjustable bracket 100 is set on said instrument board holding an extension 97 by screw bolts 99 which are passed through slots 102, and said bracket has a tapering collar so that said extension may be set at suitable angles as shown in dotted positions in Fig. 29, and the said bracket 100 may be reversed as shown in dotted position in Fig. 28, so that it may be mounted on any convenient part of the automobile body, or in any position on the instrument board. These respective assembled parts bridge the gap between the instrument board and the steering wheel and post and form a convenient covered passage for the operating rod 114 and the various wires leading to the respective switches and form the wiring bridge B, which has the supporting lugs 95' punched and bent inwardly for locating and supporting the mounting block 71 when the mounting yoke 91 is tightened on the steering post 70. A metal bushing 84 (Figs. 19 and 20) is moulded into the mounting block 71 which is preferably moulded of the phenolic condensation product, commercially known as "Bakelite" or other suitable non-conducting material, and the bore 85 forms the bearing for the pivot 43 which has a reduced section 45 and a key 46 (see Fig. 4) which is passed through the keyseated bore 45' in the lever L (Figs. 15 and 16), and the nut 47 and a suitable safety or spring lock washer 50 (see Fig. 4) mount it firmly on said pivot 43, on which the single groove sector 118 is also firmly held by a driving fit of the outer keyseated end of pivot 43, and the key 223 into its appropriately keyseated bore 110.

The single tooth and single groove bevel gear sectors 117, 118, see Figs. 22, 23, 24 and 25, form a very important element in this new controlling device; they do away with a third bearing and connected parts formerly required for the resetting device for straight ahead, and make the entire controlling device more compact, and more ready to be installed as an assembled unit, much easier to be installed in an automobile, and, most important, readily adaptable to the greatly varying angles of the steering post and steering wheel to the instrument board or body member to which the device must be attached, or, more specifically, to the greatly varying angles between the steering post and the operating rod 114. The steering post 70 is in many automobiles itself adjustable up and downward to suit the driver, and this device must follow this adjustment readily. However, the regularly cut bevel gear sectors formerly used would not adapt themselves to such adjustment, as the bevel gear teeth would loose their pitchline contact when set off into a different angle, even if the angle differed only a few degrees, and would cause lost motion and loose play and rattling of the controlled parts. All of these difficulties are overcome by my new single tooth and single groove bevel gear sectors 117, 118 as they are very pliable and keep a positive working contact with each other although the single tooth 117 is lifted clear out of the single groove 120 as shown in Fig. 23, where the sectors are shown set at the extreme angle required for signalling a left hand turn. The difference in radius between the present sectors is about one to four, and the layout is made as for other bevel gears, see pitch lines 130, 131. However, the single tooth sector 117, is made by simply bending the end of the rod 114 for the required length of the sector at a sharp right angle and then forming the tooth flat in front and back and circular at the bottom and with the required pitch angle. This tooth is extended by a flat link 115 having a bore near the bottom through which the pivot 116 is passed, and the tooth is bored in its center so that the axis of the pivot 116 forms the pitch line for both sectors 117, 118, and said pivot is either screwed or, preferably, riveted into said tooth in a manner so that said link turns readily on said pivot 116. The pivot has a head, and sufficient end play is allowed for said loose link 115 so it may be set for various angles or pitch differences by slightly bending said pivot at the end where it enters the tooth, thereby the same pair of sectors may be used for considerable variations in pitchlines or pitch angles. For a very decided difference in the pitchline or angle all that is required is to bore the hole in the tooth at the required angle. This does away with expensive machinery for cutting the regular bevel gear sectors formerly used, special cutters and layouts for each new angle of such sectors, or expensive special dies for die casting such sectors, which readily mount up to many thousands of dollars, as different dies are needed for each different angle of such pairs of bevel gear sectors. The single groove sector 118 has said grooves 120 in the center of its face which is formed into two half teeth 121 and the outer part thereof is held constantly in contact with the single tooth sector 117 by springs 122 122, as well as springs 123 123. Said springs pass respectively through holes 122' 122' and 123' 123', and their top loops 122" 123" are passed over the respective hooks 87, 88, which are firmly moulded into the top section of the mounting block 71, while the lower ends of said four expansion springs are passed through the clips 124 and set for the required tension by pushing the clips between coils for any required length of said springs to give any required tension, then said springs are hooked in pairs on each side of the elongated hub of the sector 118 by hooking the clips with their respective slots 126 onto the screws 127, the heads of same holding said clips firmly. It will be noted that with the arrangement of my clips a very fine adjustment of these expansion springs can be made, so that their respective combined tension is fairly equal for both sides of these sectors. This is for the purpose of automatically resetting said sectors and all connected or controlled parts back to their normal straight ahead position; it also has the above mentioned object of keeping the two sectors in positive contact with each other, and further to automatically take up all possible play or lost motion between said sectors, by the constant tension these springs jointly exert on said sectors and especially against the link 115 which has grooves 115' into which said springs are seated. It will be noted that a short section of each spring is extending beyond the clip and these form a very convenient handle for hooking, unhooking or adjusting said springs. The respective holes 122' 123' have at the top outward flaring half circular grooves 227 and when the sectors are set sideways as shown in Fig. 23 the respective springs take up these grooves, and bearing against the sides of the link 115 they form a definite extension of the single groove 120 and while the tooth 117 is lifted clear out of said cut groove 120 and entirely loses the contact with the outer half tooth 121, the tension of the said springs keeps the tooth 117 in positive tight contact with the inner half tooth 121, so that at any point within the limit of the swinging motion of these sectors 117, 118 they are always in positive engagement with each other. While all four springs bear against the loose link 115, it will be noted that the upper loops of the springs 122 are hooked on the inner hooks 87 while the springs 123 are hooked on the outer hooks 88 and the latter have therefore a more positive action to return the sectors into their normal straight ahead position, while the former have a more positive action on the link 115 and tooth 117. As shown in Fig. 15 the top ends of the springs are set at a slight forward angle to accommodate the pitchline and are held in said position by the said hooks. This causes a close sliding contact of the bearing surface 132 against the flat bearing surface 71' see Fig. 21, showing the rear view of the bearing block 71, and also causes an easy sliding action of the center section 1 of the lever L on top of said bearing block 71.

The re-setting system for automatically re-setting the respective signals to the normal straight ahead position comprises the following parts, which are co-acting with the lever L and the steering wheel 62. During the normal straight ahead position the small roller 36 of the ratchet 38 (Figs. 6, 15 and 32) is pressed into the notch 33 by the compression coilspring 42 set into the socket 41 of said ratchet, and exerting its tension by resting on top of yoke 91, against said ratchet, which is mounted for pivotal action by bolt 40 passing through the lugs 40' and the holes 95 (Fig. 28) in said yoke, and the bore 40" (Figs. 16, 20 and 21) in the top section of the mounting block 71, so that its pocket section 39 covers the top section of said block together with its partly exposed cables 76, 77, and its top section 38' comes in close alinement with the notched face 1' of the center section 1 of the lever L. When the lever L is set over to the left turn of the signals, see Fig. 18, then the small roller 36 rests in the notch 32, and holds the respective signals in said position as shown in Fig. 3. This signal is set while the driver is about in the middle of the block, intending to turn the next left hand corner, and the pedestrians and oncoming or following drivers are warned that such a turn is to be made, by the front and rear signals and by the light-stream signal sent over to the left side of the street from both headlights and lighting across said corner before the driver turns the corner. A loose ring 55 (Figs. 2, 15 and 18) is held in turning position between the collar surface 59 and the sector surface 58. Said sector is part of the hub 63 of the steering wheel 62 and comprises the raised rib 60 positioned for a left turn, and the raised rib 61 positioned for a right turn with respect to the straight ahead position of the steering wheel 62, and the raised connecting rib 58' which forms at its bottom the sector surface 58. The release 44 is held in sliding position over the center section 1 of the lever L by a nut 47 fitting loosely into the slot 49, see Fig. 4, which is covered by the loose washer 48. These parts are held by the top section 45 of the pivot 43 in this sliding position, and the top section of the release 44 is provided with the slightly flared bore 53 (Fig. 4) through which the bolt 37 passes and connects said release with the ratchet 38 by further passing into the top-section 38' and through the small roller 36 holding same in turning position within the small pocket 39' and being screwed into the bottom web thereof by its screw threaded end 37'. The release 44 has a flat section 52 (Fig. 4) adapted for contact with the raised surfaces 52' of the stop-sections 73 which are moulded with and are part of the bearing block 71, see Fig. 19, and the stop edges 74 act as a stop for the limited swing of lever L about the pivot 43. When the driver is now turning the left hand corner and is about two thirds around said corner, his steering wheel 62 and all related parts are in the position as shown in Fig. 18, which is at the instant when all the parts are ready for automatically releasing the parts and connected signals for straight ahead. As shown, the loose ring 55 has been pushed along by left turn rib 60 striking the lug 56 extending from said ring, and the wedge 55', carried and extending from said lug 56, is now striking the wedge-point 51 of the release 44. Thus a small fraction of a turn of the steering wheel pushes the release 44 upwards about its pivot 40 and releases the hold of the small roller 36, by lifting it out of notch 32. Then the respective springs 122, 123 automatically return the lever L and all connected signals again to the normal straight ahead position. This position with reference to the re-setting device is best shown in Fig. 26, where the arrow 67' indicates the straight ahead position of the steering wheel 62. The hub-section is broken away showing the loose ring 55 in its normal position with the lug 56 and its wedge 55' hanging in a vertical position, and the sector S, with its push-rib 60 for the left hand turn, strikes said lug 56 sooner and with a lesser turn of the steering wheel than the push-rib 61, which strikes the lug 56 later, or with a greater turn of the steering wheel 62, for a right hand turn, which is required to give the automobile the right angle turn around the right hand corner. For the left turn, the driver has the left side of the street free and, with a lesser turn of the steering wheel, is turning the automobile in a lesser angle or curve around the left hand corner, therefore the push-rib 60 is fixed as shown for said lesser turn of the steering wheel 62, so it will release the lever L and the connected signals automatically for straight ahead when the automobile so equipped has made about two thirds of a turn around the left corner, which leaves a little more turning of the steering wheel to release the parts as required for the position ready for the left release as shown in Fig. 18. The average automobile takes a little more than one complete turn of the steering wheel to make the right hand turn, and a somewhat less than a complete turn of the steering wheel to make the left hand turn, this accounts for my arrangement and combination of parts, which is prefixed and definite in its action and which I intend to claim broadly.

Figs. 26, 27 show the sector S as a separate part, and the manner in which it is attached to a hollow steering wheel hub 64. As said hollow section contains certain other electric switches (not shown) and is completely covered on top, it is quite important not to disturb said parts, or lose a lot of time to remove some of them, therefore I bore a good size hole 66 into its thin wall of die casting metal which is soft, and as said sector must stand for over a million turns during the life of the car, the way of mounting said sector is very important, small screws should not be tapped into said thin wall as they would soon loosen up and fall out, and the shavings or metal cuttings would remain inside said hollow hub and soon spoil the action of the switches therein, therefore said hole 66 is large enough to remove all the metal cuttings from said hollow hub, then the sector S with its separate round shaped hook 67, is passed through said hole and firmly hooked by pressing it downward and then tightening the screw 68 which passes loosely through sector S and mounts the latter tightly against the outer part of the hub 63. Said sector S has two extending lugs 65 which are firmly mounted on the upper heavier rim of said hub with screws 65', which do not extend into said inner chamber. This separate sector S is for equipping finished automobiles, but for automobiles prepared and planned to install this signal system the push-ribs 60 and 61 with their cross connection ribs 58' best shown in Fig. 15, are cast as an integral part of the steering wheel hub 63. The same is true with respect to the loose ring 55, which for a finished automobile is made in two halves, which are passed around the hub and joined with links and hollow rivets (not shown), while for automobiles planned and equipped for this signal system said loose ring is placed in position before the extra finishing ring 59' is fastened, against which the lower edge 59 of said loose ring bears, while the upper edge 57 bears against said cross rib edge 58, and is further held in place by the outward flaring hub 63. It is most important for an automobile signal system to have an accurately and smoothly working automatic re-setting device, as otherwise the re-setting of the signals for straight ahead is too often forgotten by the driver, and the wrongly set signals misinform and badly confuse other drivers and pedestrians and so do more damage than good.

The combination headlight and signal system will now be further described. The operating rod 114, leading from the bearing block 106, passes through a hole in the partition 134' and through a supporting washer 134. It has a tubular extension 140 firmly attached to it by the split collar 136 set tight by screw 137, and the front part is tightly clamped on the short rod 114' by the split collar 138 and screw 139, see Figs. 1 and 5, and said rod terminates into the flat hook 142 with its tapering point 143. This hook is passed into the opening 146 of the link 145 and is pivotally connected thereto by the pivot 144.

The link and ball-hinge shown in Figs. 1, 3 and 5 forms a very important operating unit between the rod 114 and the connecting rod 155 pivotally connecting the two pointers 165, as it is not only strong and very efficient in its operation but decidedly ornamental, and fits very well into the design and grouping of parts, of which the headlights with their pointers and the radiator casing 192 form the principal members. A ball 149 with its shank 150 is rigidly mounted into the tapering top end 145' of the link 145. The ball-hinge 151 is preferably punched out of sheet metal, having an upper and a lower half, both halves having a half round bearing section 155, forming the hinge connection with the connecting rod 156, and the raised section 157 of the hinge is mounted firmly on said rod 156 and is placed in the cut-out 157' and forms the side-thrust member for said hinge 151. The top section of said hinge is bent in a rearward angle to give the ball socket 158 the proper position, so that the lower half of said ball socket with its cut-out 154 has sufficient clearance for the forward and sidewise swing of said link and ball-hinge needed by said shank 150 in the motions as illustrated in Fig. 3, and in the dotted position of Fig. 5, which latter also shows how the tapering hook 42 allows the forward swing of said link 145, the hook being located inside of the tubular link, as described, and having its flat sides in sliding contact with the sides of said flat hook 142, thereby giving a strong and unfailing working contact for said parts. The two halves of said ball-hinge 151 are properly connected to said ball 149 and said rod 156 and are then firmly drawn together by the small bolt 153, or by bending over binding lugs (not shown) which are left extending from the top-half of the hinge in stamping.

The pointers and movable reflectors 180 are fully described in my said former application but here shown in new uses and relation of parts, in Figs. 1, 3, 7, 8, 9 and 31. The pointers 165 are provided with cross ribs 165' and are thereby divided into distinct rearward and forward sections, which latter sections terminate in heads 166 preferably provided with red glass crystals 167, operating in connection with the sign "Turn" on the upper sections 172 of the outwardly curved lenses 170, best shown in Fig. 3, illustrating a left turn signal, and also showing the light-stream signal lighting across the left side of the road, with said light streams from both headlights, reflected through the plain clear sections 175 of said lenses 170. The bearings 176, 178 (Fig. 9) are mounted in a vertical position by screws 177, 179, to the casing 191. The pivot 186 passing loosely through said bearing 176 firmly connects said pointer with the movable reflector 180 by the end hook 187 passing through the loop 188' and firmly clamped by screw 188, and the pivot 189 loosely passing into the lower bearing complete the mounting of these parts for joint pivotal action.

The movable reflector 180 is dished or saucer shaped, with a convex side 181 and a concave side 216 as best shown in Fig. 31, which further illustrates its normal straight-ahead position as related to the longitudinal center line c c of the headlight, showing that in said position the light rays from the light 185, pass the reflector freely and produce the regular straight ahead road lighting, but the reflected rays from the regular stationary reflector 184 against said movable reflector increase the so-called side light very considerably and increase the road lighting effect. The movable reflector 180 has a semi-circular cut out 182 and tapered edges 183, which are both for the purpose of letting light rays freely pass the rear part of the movable reflector by providing a suitable opening. This permits a certain section of light rays C to pass from the light 185 and the stationary reflector 184, see Figs. 8 and 9 for regular road lighting. The movable reflector 180 has two reflecting surfaces 181 and 216, as described, and therefore in turning said reflector, either for a right turn or for a left turn, the respective light signals from the headlights are produced by either one side or the other of said reflector. For operating said reflectors and pointers, the rear part 168 of the latter is pivotally connected each to one end of the connecting rod 156 by pivots 169. The front part of the operating rod 114' is passed through the tubular bearing 159 which passes through the hole 214' (see Fig. 7) in the outer rim of the radiator casing 214 and is fastened thereto by the bracket 161 with screws 161', while the front of said bearing passes through an additional cover 162 which may be used for adjusting said bearing and is then fastened with screws 163. The location of this bearing and operating rod adjacent to the radiator is very important for driving in cold weather, as it keeps said parts and the link and ball-hinge connection from freezing, especially in a sleet storm, while the larger central part of the pointers which are hollow below, keep the water from its pivot bearing and the heat of the light keeps these parts from freezing. In Fig. 7, the effect of the combined readable direction signals for a right hand turn, and the bright light stream signals b reaching across the right hand corner, while the car is still running straight ahead, are well illustrated; and the light streams a and c show that at the same time the road straight ahead is still well lighted. The light stream a, presents dimmed light, and the section c regular road light, passed from behind the cut out section of the movable reflector 180.

The touring light and dimmed light and their respective effects in night driving is shown in Fig. 8, where now, differing from former use, the movable reflectors 180 are both set with their concave sides 216, to the right side, or driving side of the road. As these concave sides are the more powerful reflecting surfaces, the combined light streams b from both headlights illuminate said right side of the road brightly, and as these light streams spread in an upward and downward direction when said movable reflectors are set sideways, (see light stream b c in Fig. 9) said side of the road is lighted from the ditch up to a height of fifteen to twenty-five feet, according to the distance of the house or scenery or other object from said headlights. This touring light greatly increases the enjoyment of night driving and is effected by setting the lever L a short distance to the right until the small roller 36 rests in the notch 34; see Fig. 32, where the word "Touring light" is marked on the section 1 of lever L and is plainly seen through the frame-like opening in the release 44, and the lever is set over, as stated above until the small arrow is in line with the point 44' of the release 44. Said "Touring light" is used for all driving in the open country and in any poorly lighted sections in the city, and is far more effective than the spotlights now in use, and will replace the same, as a far greater area of ground and scenery is lighted up without the use of additional lights or electric current. Moreover, it will prevent accidents, as it clearly shows up the ditch line and any obstruction or defect in the road as well as bringing road signs, cross roads and dangerous railroad crossings into plain view.

The dimmed light sections a a protect the oncoming driver and do away with the nuisance of glaring headlights which strain the eyes and nerves of the average driver to such an extent that night driving is a nuisance instead of an enjoyment. Many laws and rules have been made against glaring headlights, but no effective change has been made in the construction of such headlights. My movable reflectors 180 effectively meet this issue and do away with said glare. By setting them at an angle for touring, as shown in Fig. 8, which readily portrays the effect of dimming, the light cannot shine through the metal of the reflector, and the rays passing around it and at the side of it by reflection, are the sections a and c which, however, light up the road straight ahead well enough for enjoyable night driving. It will be noted that both dimmed sections of light a a merge a short distance in front of the headlights O I and practically leave the left side of the road dimmed for the oncoming driver and pedestrians. When the said pointers and reflectors 180 are set for a left turn signal as shown in Fig. 3, the convex sides 181 of said reflectors are turned towards the lights 185, which then send a light signal stream across the left side of the road, but leave the road straight ahead dimmed in the same relation as shown by dimmed sections a a in Fig. 7, set for a right turn.

The rear and front direction signals R and F are alike in their general construction and operation, and are alike in their respecitve location at or near the longitudinal center of the automobile so equipped. Both extend outwardly and have their respective signal signs 193, 194 extending at a certain angle in an outward direction, so that said signs 193, 194 can be read in a direction straight away and at a considerable distance from them, as well as in sidewise directions. Referring now to Fig. 11, both signals R and F are divided into two triangular chambers 191, 192 by the partitions 200, to which the lights 198, 199, respectively, and 201, 202 are connected, in a manner shown in Fig. 33, where the sockets of said lights are set at an angle so that the lights are in a central position and clamped in respective angular bearings formed by the loose blocks 209, 209' and the bottom bearing 209" and held tight by the screw bolt 204, so that said sockets extend into the opposite chamber with exposed ends to which the respective wires 10" 11" are attached. These wires lead and are fastened to the contacts 10' 11' where said lights are alternately lighted according to which side the lever L carrying the contact-plate 7 is thrown by the driver. In said Fig. 11 the lever L is thrown to the right, lighting said signals for a right hand turn where the contact point 11 completes the circuit by leading the electric current from the battery 24 through the wire 21 attached to said contact-plate 7 by the screw 20, thus lighting the signal signs 194 marked "Rite".

The combined lighting of signal and headlight for an improved signal system is carried out in the same manner and by the same switch and wiring system, regardless of whether the signal is directly attached to the headlight as shown in Fig. 1, or is mounted in proximity thereto, as shown in Fig. 13, or lighted in any relation therewith. In any case said system remains the same, and is carried out for the purpose of readily attracting the attention of other drivers or pedestrians, or traffic officers to the fact that a signal is given and in fact forms part of said signal, to thereby more readily draw their attention to the readable direction signal given, which is "rite" as shown in Fig. 13, where the signal wiring 13" connects both headlights and is shunted with the wire 12" leading to contact 12' while the wire 13" leads to the contact 13'. Thus no matter whether the signal "rite" or the signal "left" is connected by said lever L, both headlights are lighted at the same time when either of said respective signals is lighted. My system of combined lighting of a direction signal together with the headlight is of great importance, especially in daylight signalling, because the lighting of a relatively small direction signal is not readily noticed by daylight, while the lighting of the prominent headlights readily attracts attention, and thereby draws the attention to said readable direction signals.

The ornamental effect and utility combined in the practical arrangement of the front signal F, produces a very valuable new combination of parts. The covers or top-surfaces of said signals R and F differ considerably on account of the use and differing requirements for their different locations. The rear signal R has a green glass crystal 217 above the "rite" signal sign, and a red crystal 218 above the "left" signal sign, and these light up with their respective signals, and can readily be seen in the rear view mirror by the driver. The cover of the front signal F is curved and ornamentally shaped to conform with the design of the radiator casing, so as to form a unit therewith. This provides a very useful and new combination of parts for very effective use for signalling, and in addition to other valuable features the respective signal signs point in the direction to which the turn is to be made, and said points are the terminating ends of the angular signal sign surfaces and taper close to the respective surface to which the signals are attached, which adds greatly to their distinctive appearance and usefulness. See Figs. 13 and 14 which show the attractive appearance of grouping the radiator casing 214, the front direction signal F and the headlights O and I with their lights 185 lighted in conjunction with the lighting of the "rite" signal sign 194. Fig. 12 shows a part sectional side view of signal F, and shows more clearly that the signal sign frames 210 are set at a slight angle for more effective reading of the signs from a distance by oncoming drivers as well as pedestrians who see them at an angle somewhat from above, and for the same reason, to bring the signals out clearly, a shadow edge 207 extends above said signal signs, thereby preventing sunlight from directly striking the signal signs, so that their lighting can readily be seen even in strong sunlight. The ornamentally shaped and curved cover 205 may be made considerably more ornamental and entirely replace the present ornamental radiator covers. The signal F and its cover 205 have rearward extending finishing or fitting ribs 208, so they may be closely fitted to the curved surface of the radiator casing, where such signals are attached to finished cars, the space between said ribs preferably being lined with asbestos to prevent overheating of the signal, and said cover has a central partition 200' closely fitting the partition 200, to completely shut off the light from one compartment to the other. The cover is fastened by the screw 206 to the boxlike body of said signal. It is evident that the radiator casing may itself be extended and signal signs inserted therein, without changing the nature and scope of my invention and claims thereto. It is obvious also, that a screen arranged in front of the radiator, as is now more or less common practice, may be so designed as to provide for the inclusion in it of the direction signal signs and lamps for same.

The new lens 170, with its pronounced outward curve forms a very important part in my new combination headlight, and is divided into four principal sections, the upper sign section 172 with preferably frosted background and the colored sign "turn", then a central corrugated section 173 having subdivisions 174 of smaller corrugations, then two side sections 175 of preferably clear glass, facing said corrugated section on either side in somewhat straight downward lines, thus forming said corrugated section into a panel of about one half of the width of the curved surface of said lens, while the clear sections on either side, each take up about a quarter of said curved surface. The decided curve of the lens, and especially the lower part of the corrugated section, improves the roadlight, keeping the road lit when passing over a hill, where the common straight lens throws the light upward into the air, so that the road ahead is dark. For touring (see Fig. 8), the movable reflector 180 reflects the light partly through said corrugated section and partly through a clear section 175, while the top section of light is dimmed by said frosted section 172.

It is quite evident that my combination headlight may be used as a roadlight or spotlight, by reducing the size of its standard parts, and adjusting my lens and movable inner reflector thereto, I therefore include such use in my respective claims.

Various changes and modifications are considered to be within the spirit of the invention and the scope of the following claims.

What I claim is:—

1. In a turn-indicating signal system for automobiles, including means for providing a legible signal and a light-stream signal, a signal element carrying translucent members bearing direction indicia, electric lamps for illuminating said indicia, headlights, an electric lamp for each of said headlights, a single electric circuit interconnecting the lamps of said headlights, whereby when one of said lamps is lighted the other will be lighted, a separate electric circuit for each lamp of said element, and switch means for separately closing and opening the circuits of the lamps of said signal element and, simultaneously, for closing and opening the circuit of said headlights, whereby the headlights are lighted to project a signalling light stream in conjunction with the lighting of each separate direction signal.

2. In a signalling device for automobiles, electrically lighted signal devices for indicating a right turn and a left turn of the automobile, a pair of electrically lighted headlights, a controlling device arranged adjacent to the steering wheel of the automobile and including a suitable mounting block, an operating lever and means for pivotally mounting same on said block, a single electric circuit for both of said headlights and separate electric circuits for the right turn and left turn signals respectively, a plurality of contact members carried by said block and included in said circuits, and a contact plate carried by said lever and having a plurality of contact points equal in number to and cooperating with the contact members of the block, and means for connecting said contact points with a source of electrical energy, whereby when said lever is swung into contact position to the left the left turn indicating signals and said pair of headlights are lighted, and when said lever is swung into contact position to the right the right turn indicating signals and said pair of headlights are lighted, and when said lever is in an intermediate position neither the turn indicating signals nor the headlights are lighted.

3. A signalling device for vehicles, including a headlight having a lens, a movable direction indicator pivotally mounted on the headlight, said indicator having an arm the end of which extends over and in juxtaposition to said lens and is laterally movable adjacent thereto, means providing a legend readable with respect to the end of said indicator and indicating a turn, means arranged adjacent to the steering wheel of the vehicle and including switch mechanism for said headlight and operable to move said indicator and light said headlight to indicate a contemplated turn of the vehicle, and means operable in response to turning of said steering wheel for actuating said first-mentioned means to automatically reset said indicator to straight-ahead position and extinguish said headlight prior to completion of said turn.

4. A signalling device for vehicles, including a headlight having a lens, said lens bearing a legend indicating a turn of the vehicle, a movable direction indicator pivotally mounted on the headlight, said indicator having an arm the end of which extends over and in juxtaposition to said legend, means arranged adjacent to the steering wheel of the vehicle and including switch mechanism for said headlight and operable to move said indicator and light said headlight to indicate a contemplated turn of the vehicle, and means operable in response to turning of said steering wheel for actuating said first-mentioned means to automatically reset said indicator to straight-ahead position and extinguish said headlight prior to completion of said turn.

5. A signalling device for vehicles, including a headlight having a lens of convex form and bulging forwardly from said headlight, said lens having a legend indicating a turn of the vehicle, a movable direction indicator pivotally mounted on the headlight, said indicator including an arm curved to approximately conform to the convexity of said lens and having an end movable adjacent to and over said legend, means arranged adjacent to the steering wheel of the vehicle and including switch mechanism for said headlight and operable to move said indicator and light said headlight to indicate a contemplated turn of the vehicle, and means operable in response to turning of said steering wheel for actuating said first-mentioned means to automatically reset said indicator to straight-ahead position and extinguish said headlight prior to completion of said turn.

EMIL R. LOCHMAN.